INVENTOR.
Paul Vogt
BY
HIS ATTORNEYS

Patented Apr. 15, 1952

2,593,077

UNITED STATES PATENT OFFICE 2,593,077

KNOCKDOWN STAND

Paul Vogt, Cheektowaga, N. Y.

Application May 20, 1947, Serial No. 749,233

7 Claims. (Cl. 248—165)

This invention relates to improvements in cooking racks such as are used in connection with the cooking of roasts, for supporting the roasts in the desired position during cooking.

One of the objects of this invention is to provide a cooking rack of this type of improved construction which can readily be assembled or taken apart and which occupies very little space when not in use.

Another object of this invention is to provide a rack of this type which comprises few parts and which can be easily assembled into operative position for use, and in which the parts interlock when assembled. A further object is to provide a rack of this type in which the food to be cooked is supported on a flexible plate which can easily be cleaned, and which can be bent into trough shape to support the articles and into flat condition for storage. It is also an object of this invention to provide a cooking rack comprising a readily flexible plate which can be easily bent into the desired position to support a roast or other article of food, a base or foot portion detachably connected therewith, and bails or handles by means of which the rack can readily be lifted and which bails also serve to interlock with the base or foot portion to hold all parts of the rack in assembled position.

Other objects and advantages of this invention will appear from the following description and claims.

Figure 1:
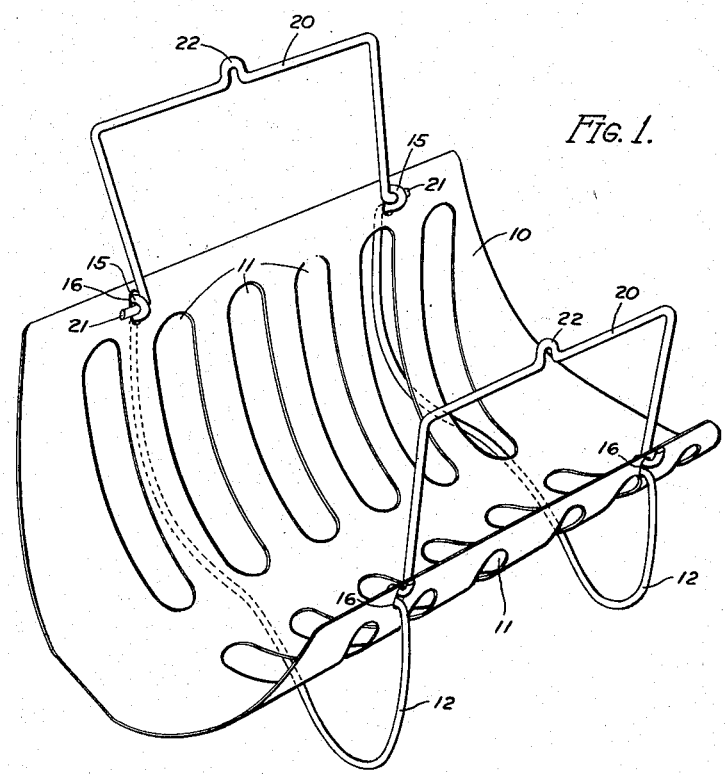
Fig. 1 is a perspective view of a cooking rack embodying this invention.

The rack embodying my invention includes a supporting member 10 for articles of food to be cooked, which is of arcuate form when in use so as to form a trough-like receptacle. Preferably this member is made of thin flexible sheet material, such for example as a stainless steel, so that the plate may be readily bent into trough shape, as shown in Fig. 1, or into flat form for storage when not in use. The plate may be provided with a plurality of holes or openings of any desired form and arrangement, such for example, as a series of elongated slots 11 shown in Fig. 1. Holes or openings of any other desired shapes may be provided, and the supporting member may be rigid trough-like form, if desired.

Figure 2:
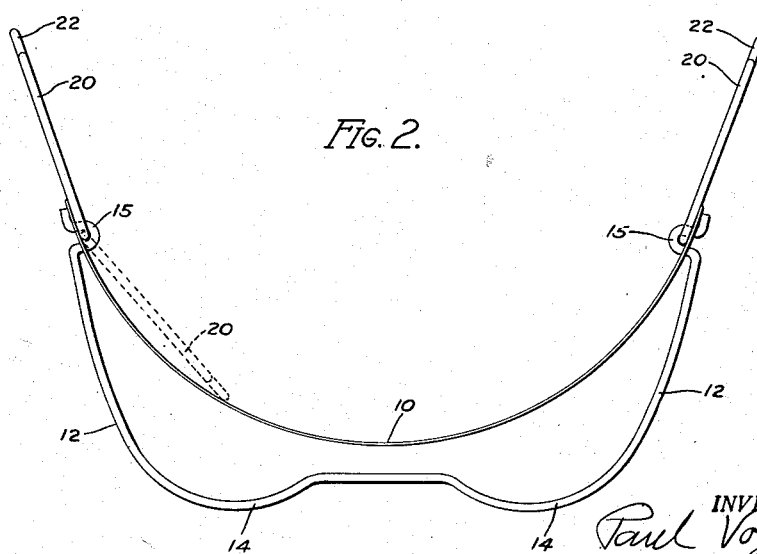
Fig. 2 is an end elevation thereof.

It is, of course, desirable to support a cooking rack of this type over a pan to receive the juices, and consequently, I provide a support or base member for the plate 10 which, in the construction illustrated, is in the form of a pair of legs 12 which are preferably made of relatively stiff wire having considerable rigidity so that these legs will normally retain their shapes. The lower ends of the legs are formed to provide feet 14 which may stand on a pan on which the rack is supported. The legs or base members 12 are also provided with upwardly extending side portions provided at their upper ends with suitable means for engaging the plate 10 to support the same. In the construction shown for this purpose, the side portions have approximately U-shaped bends or loops 15 and the plate 10 is provided near the opposite edges thereof with slots 16 into which these U-shaped end portions of the legs or base members may extend. When the U-shaped parts 15 of the legs enter the slots, the slots serve the purpose of holding the legs 12 in vertical or upright planes, so that no cross braces are required to connect the legs to hold them in operative positions. The U-shaped portions 15 of the legs also serve to hold the plate 10 in its curved or bent position, as clearly shown in Fig. 2. Consequently, in assembling the legs and the plate, it is merely necessary to bend the plate in such a manner that the U-shaped projecting parts or loops 15 of the legs can be readily inserted into the slots 16.

Since the legs are made of wire and the plate is flexible, it will be obvious that the curvature of the plate may readily be varied by bending the upwardly extending parts of the legs toward or from each other so that the curvature of the plate may be varied to suit roasts of different sizes or shapes. Thus for a small roast, it may be desirable to bend the upwardly extending parts of the legs toward each other, thus bringing the sides of the plate nearer to each other than shown in Fig. 2. Rigid legs may, however, be used, if desired.

In racks of this type, it is desirable to provide bails or handles by means of which the rack can be lifted and handled, and in the construction illustrated, I have provided a pair of handles 20 which are preferably also made of wire and are of inverted U-shape. These bails or handles preferably have their ends 21 bent approximately at a right angle to the sides thereof. In the construction illustrated, the ends of the bails or handles are bent outwardly. These ends may readily be inserted into the portions of the U-shaped members 15 which extend beyond the inner and upper face of the plate 10, as clearly shown in the drawings. The wire handles or bails are sufficiently resilient so that the extensions 21 of the ends thereof will normally be held in engagement with the U-shaped parts of the legs 12 by the resiliency of the metal of which the parts are made. The bails or handles, consequently, not only serve to facilitate the handling of the rack, but also releasably lock the legs 12 in their operative relations to the plate 10. The ends of the bails or handles engaging the U-shaped portions 15 of the legs supplement the slots 16 in holding the legs in substantially upright planes in positions to support the rack. When it is not desired to use the handles or bails, they, of course, may be folded downwardly against the plate 10 by swinging them about their pivotal connections with the U-shaped end portions 15 of the legs, one of the handles or bails being shown in this position in broken lines in Fig. 2

It may also be desirable to suspend the rack with the articles of food thereon so that the same may be turned or rotated while being roasted. For this purpose, the bails or handles are provided in the middle portions thereof with U-shaped integral bends 22 which facilitate the supporting of the rack by means of wires or hooks in position to be rotatably supported with relation to a fire or other source of heat. These bends in the bails are also desirable in case the rack is suspended from a hook, since they prevent the hook from sliding along the bail 20 and thus possibly spilling the contents of the rack.

When the rack is not required for cooking, it can readily be disassembled by first moving the two legs of the U-shaped handles or bails 20 so that the projections 21 disengage the U-bends or loops 15 of the legs. The legs can then be separated from the plate 10 by bending the opposite sides of the plate toward each other to disengage the loops 15 of the legs from the slots 16 in the plate. The plate may then be flexed into a flat position to facilitate the storing of the same, or if spring material, it will return to flat position because of its own resilience.

The rack described has the advantage that the parts thereof can be very easily cleaned when disconnected from each other. A flat plate can, of course, be cleaned much more readily than a wire rack, and the individual wire legs and bails can also be cleaned more readily when disconnected from each other. My improved rack can, therefore, be much more readily kept in a clean and sanitary condition than racks as heretofore constructed, and the parts of the rack can be stored in very small space when the same are laid flat.

The cooking rack has the further advantage that when the roast or other food article is done, the rack can easily be lifted from the pan by means of the handles or bails 20. The rack can then be placed on a platter on which the food is to be served and tilted, so that the roast or other articles of food rolls or slides from the cradle on the platter on which it may be carved. This makes it unnecessary to use fork, spatulas, or other implements to place the roast or other article on a platter. If desired, when the article is completely cooked, the bail or handle on one side may be removed from the rack to facilitate the rolling or sliding of the article from the rack to a platter. If desired, however, the carving may be performed while the article is in the rack.

It will be understood that various changes in the details, materials and conditions which have been hereinabove described in order to explain the nature of the invention may be made by those skilled in the art within the principle and scope of the invention as expressed in the appended claims.

I claim as my invention:

1. A cooking rack including a readily flexible perforate metal sheet bent into trough shape to form a support for an article to be cooked, and a pair of wire leg members having foot portions formed to rest on a supporting surface and having upwardly extending parts at opposite sides thereof between which said trough-shaped sheet fits, said upwardly extending parts being provided with loop-shaped projections extending toward each other, said sheet having slots therein into which said projections fit to support said sheet from said leg members and for holding said leg members in upright positions, said projections being movable into and out of said slots and permitting said leg members to be disconnected from said sheet.

2. A cooking rack including a readily flexible perforate metal sheet bent into trough shape to form a support for an article to be cooked, a pair of wire leg members having foot portions formed to rest on a supporting surface and having upwardly extending parts at opposite sides thereof between which said trough-shaped sheet fits, said upwardly extending parts being provided with loop-shaped projections extending toward each other, said sheet having slots therein into which said projections enter to support said sheet from said leg members and for holding said leg members in upright positions, said projections being movable into and out of said slots and permitting said leg members to be disconnected from said sheet, and bail-shaped handle portions having parts formed to extend through said loop-shaped projections to hold said loops against being withdrawn from said slots, each handle portion being connected to said projections at one side only of said sheet.

3. A cooking rack including a readily flexible perforate metal sheet bent into trough shape to form a support for an article to be cooked, and a pair of wire leg members having foot portions formed to rest on a supporting surface and having upwardly extending parts at opposite sides thereof between which said sheet fits, said upwardly extending parts being provided with loop-shaped projections extending toward each other, said sheet having slots therein into which said projections fit to support said sheet from said leg members and for holding said leg members in upright positions, said projections being movable into and out of said slots and permitting said leg members to be disconnected from said sheet, said upwardly extending parts of said legs being bendable to vary the width and curvature of the trough shape to facilitate supporting articles of different sizes.

4. A cooking rack including a perforate, readily flexible, metal sheet of resilient material bent into trough shape, a pair of wire leg members having foot portions formed to rest on a supporting surface and having upwardly extending integral parts between which said sheet is arranged, all of said parts of said leg members lying substantially in a single plane, said sheet having slots near the side edges thereof and said upwardly extending parts of said wire leg members having loops extending into said slots when said sheet is bent into trough shape, said loops extending beyond the inner surface of said sheet, said slots cooperating with said loops for holding said leg members in upright positions and for supporting said sheet in spaced relation to a supporting surface on which the rack rests, and a pair of bail members of substantially inverted U-shape having the ends thereof bent substantially in the plane of said bail at a substantially right angle to the sides of the U-shaped bail, and each extending into said loops at the inner surface of said sheet for pivotally securing said bails relatively to said sheet and said leg members and for locking said loops against disengagement from said slots of said sheet, said projections of said bail members being readily disengageable from said loops by flexing said bail members.

5. A cooking rack including a perforate trough-shaped supporting plate, and a pair of wire leg members having bent portions forming feet to rest on a supporting surface and having upwardly extending parts provided with projections engageable with said supporting plate to hold said leg members in operative relation to said supporting plate, said projections being in the form of U-shaped bends, said supporting plate having slots in the sides thereof into which said bends fit to hold said leg members in operative relation to said supporting plate, all parts of each leg member lying substantially in the same plane.

6. A cooking rack including a perforate trough-shaped supporting plate having slots in the upper portions of the sides thereof, and a pair of wire leg members having bent portions forming feet to rest on a supporting surface and having upwardly extending parts provided with U-shaped bends which extend into said slots of said supporting plate to hold said leg members in operative assembled relation to said supporting plate, and bails having substantially horizontally extending ends projecting into the parts of said U-shaped bends which project through said slots, to releasably lock said leg members to said supporting plate.

7. A cooking rack according to claim 6, in which said bails are provided intermediate of the ends thereof with integral upwardly extending bends by means of which the rack may be supported for lifting the same.

PAUL VOGT.

REFERENCES CITED

The following references are of record in the file of this patent:

UNITED STATES PATENTS

| Number | Name | Date |
| --- | --- | --- |
| 471,424 | Hov | Mar. 22, 1892 |
| 717,643 | Warren | Jan. 6, 1903 |
| 1,550,138 | Baker | Aug. 18, 1925 |
| 2,222,689 | Saffell | Nov. 19, 1940 |